Patented June 15, 1926.

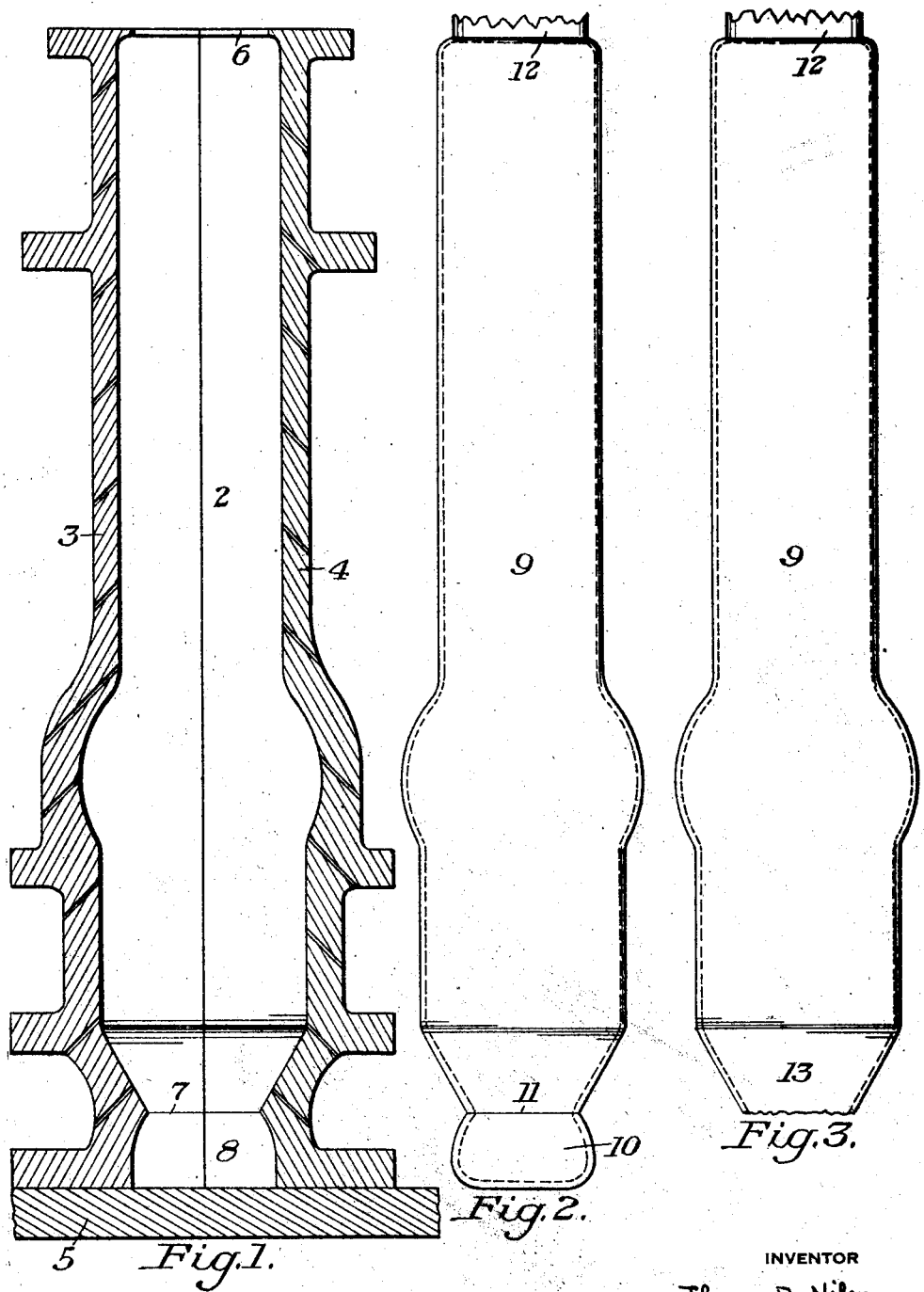

1,588,852

UNITED STATES PATENT OFFICE.

THOMAS A. NILAN, OF HURRICANE, WEST VIRGINIA.

METHOD OF MAKING MOLD-BLOWN GLASS ARTICLES.

Application filed August 23, 1924. Serial No. 733,725.

This invention relates to the making of mold-blown glass articles, and is particularly directed toward the elimination of the annealing operation which has heretofore been considered necessary in their manufacture.

In the making of mold-blown glass articles, such as mold-blown lamp chimneys and the like, it has been considered essential to pass the articles through an annealing leer in order to overcome the stresses in the glass and insure a satisfactory product. This operation is, of course, an added expense in manufacture and involves the use of large and expensive equipment. I have found that the leer annealing may be done away with if an opening other than the blow opening is formed in the mold-blown article and heat is thereafter applied to the article. Preferably, the article is blown with a portion adapted to be severed and leave an opening in the article. Heat is then applied adjacent the opening, thus permitting equalization of the temperature of the inside and outside of the article and it is unnecessary to pass the blown articles through an annealing oven as heretofore.

In the accompanying drawings, which illustrate one application of my invention:—

Figure 1 is a vertical section through a mold used in carrying out my invention.

Figure 2 is a side elevation of a mold-blown glass article formed therein, and

Figure 3 is a similar view of the article after a portion has been severed therefrom.

In the illustrated embodiment of the invention there is shown a paste mold 2 formed from two halves 3 and 4 and mounted on a supporting plate 5. The glass gather is inserted in the mold through an opening 6 in the upper end thereof and is blown in the usual manner. The mold in this embodiment of the invention is for the production of a lamp chimney, as will be noted.

Adjacent the bottom, the mold is reduced in section to a neck portion 7 and is then enlarged into a cavity 8.

The mold is operated in the usual manner and a mold-blown article 9, as shown in Figure 2, results. It will be noted that this article has a hollow portion 10 at the bottom thereof connected to the main body of the article by a necked-in portion 11. Heretofore the bottom of mold-blown lamp chimneys has been formed in any manner convenient to the mold maker, or has been so shaped as to form a tumbler or other glass article after it has been cracked off. In any case, the only opening in the article has been the blow opening 12 and it has been necessary to pass the articles through an annealing leer to equalize the temperature of the inner and outer portions and prevent breakage.

But my improved method, however, the hollow portion 10 is severed from the main body of the article at the neck 11 which forms a line of severance. The severing may be done in any manner, as by an ordinary glass maker's tool.

After the portion 10 is removed the article is of the form shown in Figure 3 and, of course, is still attached to the blow pipe. Heat is then applied to the lower end of the article and since this end is open both the inside and outside of the article are heated and the necessity for annealing in a leer is done away with. If desired, the tapered portion 13 may be opened up to conform with the remainder of the article.

The article may be set aside and handled like ordinary lamp chimneys after the reheating operation, and may then be cracked off at the ends and finished as desired.

I have shown my invention as specifically applied to a lamp chimney, but my improved method is obviously applicable to many other glass articles, as will be apparent to those skilled in the art. The advantages of my invention arise from the elimination of the annealing operation which has heretofore been considered essential in the manufacture of articles of this character.

While I have specifically illustrated one example of my invention it will be understood that it is not limited to such example, but may be applied to other articles and otherwise embodied within the scope of the following claims.

I claim:

1. The method of making mold-blown glass articles which includes providing a mold-blown glass article with an opening other than the blow opening, and specially applying heat to the portions of the article adjacent the opening, substantially as described.

2. The method of making mold-blown glass articles which includes providing a mold-blown glass article having a blow opening at one end and another opening remote therefrom, and reheating the portions of the article adjacent the last mentioned opening, substantially as described.

3. The method of making mold-blown glass articles which includes forming a mold-blown glass article, forming an opening therein other than the blow opening, and especially applying heat to the portions of the article adjacent the opening, substantially as described.

4. The method of making mold-blown glass articles, which includes forming a mold-blown glass article having a portion adapted to be severed and leave an opening in the article, severing such portion, and specially applying heat to the portions of the article adjacent the opening, substantially as described.

5. The method of making mold-blown glass articles which includes blowing a glass article in a mold, providing the mold-blown article with an opening other than the blow opening, and reheating the article while it is still attached to the blow pipe, substantially as described.

6. The method of making mold-blown glass articles which includes providing a mold-blown glass article with an opening other than the blow opening, and specially applying heat to the portions of the article adjacent the opening while the article is still attached to the blow pipe, substantially as described.

7. The method of making mold-blown glass articles which includes forming a mold-blown glass article having a portion adapted to be severed and leave an opening in the article, severing such portion, and thereafter reheating the article while it is still attached to the blow pipe, substantially as described.

8. The method of making mold-blown glass articles which includes forming a mold-blown glass article having a portion adapted to be severed and leave an opening in the article, severing such portion, and specially applying heat to the portions of the article adjacent the opening while the article is still attached to the blow pipe, substantially as described.

In testimony whereof I have hereunto set my hand.

THOMAS A. NILAN